United States Patent
Lee et al.

(10) Patent No.: US 8,331,080 B2
(45) Date of Patent: Dec. 11, 2012

(54) ELECTROLYTE FOR LITHIUM ION CAPACITOR AND LITHIUM ION CAPACITOR INCLUDING THE SAME

(75) Inventors: Sang Kyun Lee, Gyunggi-do (KR);
Dong Hyeok Choi, Gyunggi-do (KR);
Hyun Chul Jung, Gyunggi-do (KR);
Bae Kyun Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 220 days.

(21) Appl. No.: 12/926,315

(22) Filed: Nov. 9, 2010

(65) Prior Publication Data
US 2011/0304952 A1 Dec. 15, 2011

(30) Foreign Application Priority Data
Jun. 10, 2010 (KR) .................. 10-2010-0054827

(51) Int. Cl.
*H01G 9/035* (2006.01)
(52) U.S. Cl. ........ 361/505; 361/523; 361/517; 361/519; 361/525; 361/529
(58) Field of Classification Search .................. 361/505, 361/509–512, 516–517, 519, 523, 525, 528–529
See application file for complete search history.

(56) References Cited

U.S. PATENT DOCUMENTS

| | | | | |
|---|---|---|---|---|
| 5,981,107 A | * | 11/1999 | Hamano et al. | 429/231.95 |
| 6,043,975 A | * | 3/2000 | Kanbara et al. | 361/502 |
| 6,765,785 B2 | * | 7/2004 | Honda et al. | 361/525 |
| 6,862,168 B2 | * | 3/2005 | Ando et al. | 361/504 |
| 2010/0266905 A1 | | 10/2010 | Jeon et al. | |
| 2010/0273064 A1 | | 10/2010 | Jeon et al. | |
| 2011/0150736 A1 | * | 6/2011 | Hagiwara et al. | 423/276 |

FOREIGN PATENT DOCUMENTS

| | | |
|---|---|---|
| JP | 2006-286926 | 10/2006 |
| KR | 10-2008-0109644 | 12/2008 |
| KR | 10-2009-0030237 | 3/2009 |
| KR | 10-2010-0003177 | 10/2010 |

OTHER PUBLICATIONS

Korean Office Action issued Jul. 1, 2011 in corresponding Korean Patent Application 10-2010-0054827.

* cited by examiner

*Primary Examiner* — Nguyen T Ha

(57) ABSTRACT

There are provided an electrolyte for a lithium ion capacitor and a lithium ion capacitor including the same. The electrolyte for a lithium ion capacitor according to the present invention includes: a lithium salt; and a mixing solvent including i) two or more compounds selected from a group consisting of cyclic carbonate compounds, ii) one or more compounds selected from a group consisting of linear carbonate compounds represented by a specified Formula, and iii) one or more compound selected from a group consisting of propionate compound represented by a specified Formula.

11 Claims, 2 Drawing Sheets

ELECTROLYTE FOR LITHIUM ION CAPACITOR AND LITHIUM ION CAPACITOR INCLUDING THE SAME

CROSS-REFERENCE TO RELATED APPLICATIONS

This application claims the priority of Korean Patent Application No. 10-2010-0054827 filed on Jun. 10, 2010, in the Korean Intellectual Property Office, the disclosure of which is incorporated herein by reference.

BACKGROUND OF THE INVENTION

1. Field of the Invention

The present invention relates to an electrolyte for a lithium ion capacitor and a lithium ion capacitor including the same, and more particularly, to an electrolyte for a high-capacity and low-resistance lithium ion capacitor and a lithium ion capacitor including the same.

2. Description of the Related Art

A stable supply of energy is one of the most important factors in the operation of various electronic products such as information telecommunication devices. Generally, the function is performed by a capacitor. That is, the capacitor serves to charge and discharge electricity in and from circuits of information telecommunication devices and various other electronic products, thereby making it possible to stabilize the electricity flow in the circuits. The general capacitor has a very short charging and discharging time and a long lifespan but has a limitation when being used as a storage device due to a high output density and a small energy density.

In order to overcome this limitation, a new capacitor such as an electric double layer capacitor having a very short charging and discharging time and the high output density has recently been developed, which recently drawn much attention as a next-generation energy device, together with a rechargeable battery.

Recently, various electrochemical capacitors operated on a principle similar to the electric double layer capacitor have been developed and an energy storage device called a hybrid capacitor, according to a combination of charging principles of the lithium ion rechargeable battery and the electric double layer capacitor, has come into prominence. Consequently the hybrid capacitor, a lithium ion capacitor having the high energy density of a rechargeable battery and the high output characteristics of an electric double layer capacitor has recently been prominent.

The lithium ion capacitor contacts an anode capable of absorbing and separating lithium ions to a lithium metal to previously absorb (or, dope) the lithium ions in the anode by using a chemical method or an electrochemical method, and lowers a cathode potential to increase the withstand voltage and remarkably increase the energy density.

However, when the electrolyte used in the rechargeable battery of the related art is used in the lithium ion capacitor, there are problems in that the capacity thereof is degraded, the resistance is increased, and the output characteristics are degraded, under the low temperature.

SUMMARY OF THE INVENTION

An aspect of the present invention provides an electrolyte for a high-capacity and low-resistance lithium ion capacitor and a lithium ion capacitor including the same.

According to an aspect of the present invention, there is provided an electrolyte for a lithium ion capacitor, including: a lithium salt; and a mixing solvent including i) two or more compounds selected from a group consisting of cyclic carbonate compounds, ii) one or more compounds selected from a group consisting of linear carbonate compounds represented by the following Formula 1, and iii) one or more compounds selected from a group consisting of propionate compounds represented by the following Formula 2.

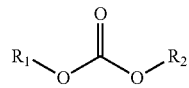

Formula 1 in the above Formula 1,
$R_1$ and $R_2$ are substituted into a halogen element or an alkyl group having 1 to 3 non-substituted carbon atoms, and

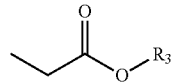

Formula 2 in the above Formula 2,
R3 is substituted into a halogen element or an alkyl group having 1 to 4 non-substituted carbon atoms.

The cyclic carbonate compound may be selected from a group consisting of ethylene carbonate, propylene carbonate, fluoroethylene carbonate, and butylene carbonate.

The mixing ratio between the two or more cyclic carbonate compounds may be 3:1 to 1:3.

The two or more cyclic carbonate compounds may be ethylene carbonate and propylene carbonate and the mixing ratio of the ethylene carbonate and the propylene carbonate may be 3:1 to 1:3.

The content of the cyclic carbonate compound may be 20 parts by weight to 50 parts by weight for 100 parts by weight of the mixing solvent.

The linear carbonate compound may be selected from a group consisting of dimethyl carbonate, ethyl methyl carbonate, diethyl carbonate, and methyl propyl carbonate.

The content of the cyclic carbonate compound may be 10 parts by weight to 40 parts by weight for 100 parts by weight of the mixing solvent.

The propionate compound may be selected from a group consisting of methyl propionate, ethyl propionate, propyl propionate, or butyl propionate.

The content of the propionate compound may be 20 parts by weight to 50 parts by weight for 100 parts by weight of the mixing solvent.

The mixing solvent may include ethylene carbonate, propylene carbonate, ethyl methyl carbonate, and methyl propionate.

According to an aspect of the present invention, there is provided a lithium ion capacitor, including: a first electrode made of an electrode material capable of reversibly carrying lithium ions; a second electrode disposed to be opposite to the first electrode; a separating membrane disposed between the first and second electrodes; and an electrolyte impregnating the first electrode, the second electrode, and the separating membrane, wherein the electrolyte includes: a lithium salt; and a mixing solvent including i) two or more compounds selected from a group consisting of cyclic carbonate compounds, ii) one or more compounds selected from a group consisting of linear carbonate compounds represented by the following Formula 1, and iii) one or more compounds selected from a group consisting of propionate compounds represented by the following Formula 2.

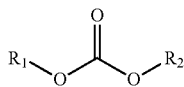

Formula 1 in the above Formula 1, $R_1$ and $R_2$ are substituted into a halogen element or an alkyl group having 1 to 3 non-substituted carbon atoms, and

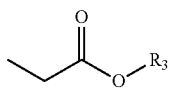

Formula 2 in the above Formula 2, $R_3$ is substituted into a halogen element or an alkyl group having 1 to 4 non-substituted carbon atoms.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
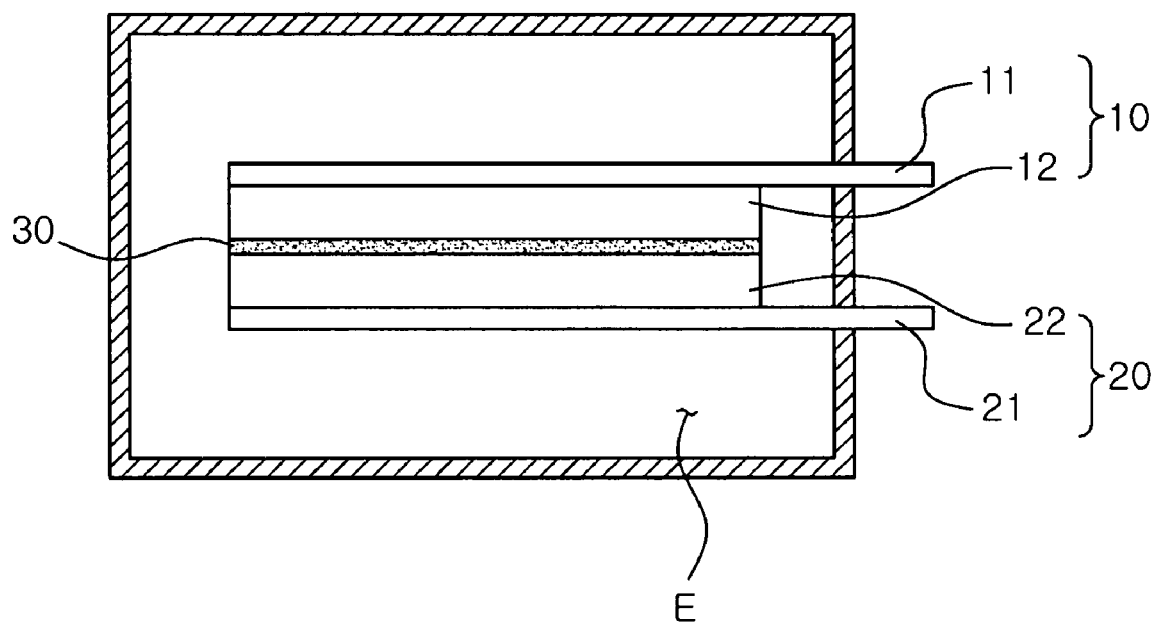
FIG. 1 is a cross-sectional view schematically showing an apparatus for a lithium ion capacitor according to an exemplary embodiment of the present invention.

Hereinafter, exemplary embodiments of the present invention will be described in detail. However, the exemplary embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components.

FIG. 1 is a schematic cross-sectional view showing a lithium ion capacitor according to an exemplary embodiment of the present invention. Referring to FIG. 1, a lithium ion capacitor according to an exemplary embodiment of the present invention includes a first electrode 10 and a second electrode 20 that are disposed to be opposite to each other, a separating membrane 30 that is disposed between the first and second electrode, and an electrolyte E impregnating the first electrode, the second electrode, and the separating membrane.

Electricity having different polarities is applied to the first and second electrodes 10 and 20. A plurality of first and second electrodes may be stacked in order to obtain the desired electricity capacity.

In the exemplary embodiment, the first electrode 10 may be set to be a "cathode" and the second electrode 20 may be set to be an "anode".

The first electrode 10 may be made by forming a first electrode material 12 on a first conductive sheet 11.

The first electrode material 12 can reversibly carry lithium ions but is not limited thereto. For example, the first electrode material 12 may use carbon materials, such as graphite, hard carbon, cokes, or the like, and polyacene-based materials.

In addition, the first electrode 10 may be formed by mixing the first electrode material 12 with the conductive materials but the conductive material is not limited thereto. For example, the conductive materials may include acetylene black, graphite, metal powder, or the like.

The thickness of the first electrode material 12 is not specifically limited but may be formed to be, for example, 15 to 100 µm.

The first conductive sheet 11 serves as a current collector that transfers electrical signals to the first electrode material 12 and collects the accumulated charges and may be made of a metallic foil, a conductive polymer, or the like. The metallic foil may be made of stainless steel, copper, nickel, or the like.

In addition, although not shown, the first electrode material is manufactured as a sheet in a solid sheet without using the first conductive sheet, such that it can be used as the first electrode.

The first electrode 10 is pre-doped with lithium ions. Wherein the potential of the first electrode may be lowered to approximately 0 V and thus, the potential difference between the first electrode and the second electrode is increased, thereby making it possible to improve the energy density and output characteristics of the lithium ion capacitor.

The second electrode 20 may be made by forming a second electrode material 22 on a second conductive sheet 21.

The second electrode material 22 is not specifically limited but may use, for example, activated carbon and a mixture of the activated carbon, the conductive material, and a binder.

The thickness of the second electrode material 22 is not specifically limited but may be formed to be, for example, 15 to 100 µm.

The second conductive sheet 21 serves as a current collector that transfers electrical signals to the second electrode material 22 and collects the accumulated charges and may be made of a metallic foil, a conductive polymer, or the like. The metallic foil may be made of aluminum, stainless steel, or the like.

In addition, although not shown, the second electrode material is manufactured as a sheet in a solid sheet without using the second conductive sheet, such that it can be used as the second electrode.

A separating membrane 30 may be disposed between the first and second electrodes in order to provide electrical insulation therebetween and the separating membrane 30 may be made of porous materials to transmit ions. In this case, an example of a porous material may include, for example, polypropylene, polyethylene, a glass fiber, or the like.

An electrolyte E may be the electrolyte for the lithium ion capacitor according to the exemplary embodiment of the present invention.

The electrolyte according to the exemplary embodiment of the present invention includes, a lithium salt, a mixing solvent, wherein the mixing solvent includes i) two or more compounds selected from a group consisting of cyclic carbonate compounds, ii) one or more compounds selected from a group consisting of linear carbonate compounds represented by a specific Formula, and iii) one or more compounds selected from a group consisting of propionate compounds represented by a specific Formula.

The electrolyte for the lithium ion capacitor according to the present invention includes a lithium salt as an electrolyte. Any lithium salt capable of generating lithium ions by being dissolved in a solvent can be used. An example of the lithium salt may include $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, $LiAsF_6$, $LiSbF_6$, $LiI$, $LiCF_3CO_2$, $LiPF_3(C_2F_5)_3$, $LiPF_3(CF_3)_3$, $LiPF_4(C_2F_5)_2$, $LiPF_4(CF_3)_2$, $LiPF_6(C_2F_6)$ or $LiPF_5(CF_3)$ or a mixture of two or more thereof.

The concentration of the lithium salt is not specifically limited if it can maintain the electric conductivity of the electrolyte. The concentration of the lithium salt may be, for example, 0.1 to 2.5 mol/L. The electric conductivity of the electrolyte is not limited thereto but may be 8 mS/cm or more at 25° C., preferably, 10 Ms/cm.

Further, the electrolyte for the lithium ion capacitor according to the present invention uses a mixing solvent including i) two or more compounds selected from a group consisting of cyclic carbonate compounds, ii) one or more compounds selected from a group consisting of linear carbonate compounds represented by a specific Formula, and iii) one or more compounds selected from a group consisting of propionate compounds represented by a specific Formula.

i) The cyclic carbonate compound is not specifically limited, but may be one of, for example, ethylene carbonate, propylene carbonate, fluoroethylene carbonate, and butylene carbonate, or the like, or a mixture of two or more thereof.

The cyclic carbonate compound has an advantageous effect on the dissociation of the lithium salt. When the cyclic carbonate compound uses a mixture of two or more thereof, the dielectric constant is increased, thereby making it possible to further facilitate the dissociation of the lithium salt.

The combination of the two or more cyclic carbonate compounds may be ethylene carbonate and propylene carbonate.

The content of the cyclic carbonate compound may be 20 parts by weight to 50 parts by weight for 100 parts by weight of the mixing solvent. In addition, the mixing ratio between the two or more cyclic carbonate compound may be 3:1 to 1:3.

ii) the linear carbonate compound may be represented by the following Formula 1.

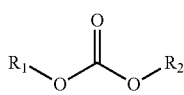

Formula 1 in the above Formula 1, $R_1$ and $R_2$ are substituted into a halogen element or an alkyl group having 1 to 3 non-substituted carbon atoms.

The cyclic carbonate compound is not limited thereto, but may include, for example, dimethyl carbonate, ethyl, methyl carbonate, diethyl carbonate, methyl propyl carbonate, or the like, or a mixture of one or more thereof.

i) The cyclic carbonate compound and ii) the linear carbonate compound are used together, such that the rise in viscosity of the electrolyte can be suppressed and the electrical conductivity of the electrolyte can be increased. In addition, the degree of dissociation of the lithium salt may be further increased and the normal temperature and low temperature characteristics of the electrolyte may be maintained in equilibrium.

The combination of the two or more cyclic carbonate compounds and the linear carbonate compound may be ethylene carbonate, propylene carbonate, and ethyl methyl carbonate.

The content of the cyclic carbonate compound may be 10 parts by weight to 40 parts by weight for 100 parts by weight of the mixing solvent.

ii) the propionate compound may be represented by the following Formula 2.

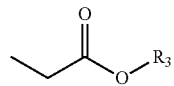

Formula 2 in the above Formula 2, $R_3$ is substituted into a halogen element or an alkyl group having 1 to 4 non-substituted carbon atoms.

The propionate compound is not limited thereto, but may be one of, for example, methyl propionate, ethyl propionate, propyl propionate, and butyl propionate, or the like, or a mixture of one or more thereof.

The propionate compound has a low melting point and a high boiling point to exhibit excellent low temperature characteristics and has excellent wettability for the electrode material but low reactivity with the electrode material. In addition, the propionate compound may properly coordinate the lithium ion to exhibit high ion conductivity at room temperature and at low temperature.

The lithium ion capacitor according to the exemplary embodiment of the present invention may use the electrolyte including the foregoing mixing solvent to exhibit the high capacity and low resistance at the normal temperature and the low temperature.

Further, the electrolyte according to the exemplary embodiment of the present invention may be used for the process of pre-doping the first electrode 10 with the lithium ions.

Figure 2A:
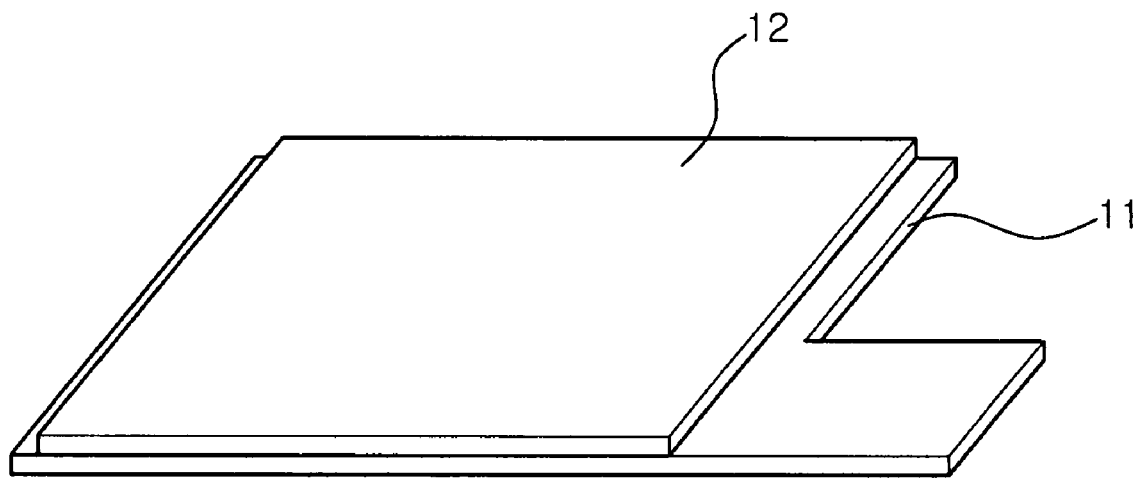
FIG. 2A is a perspective view schematically showing a first electrode according to an exemplary embodiment of the present invention.
Figure 2B:
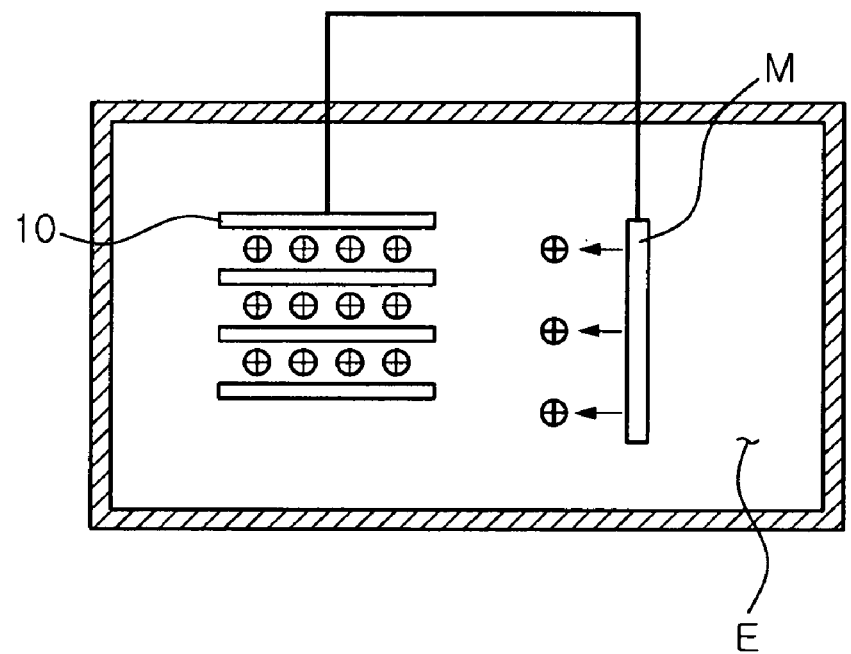
FIG. 2B is a diagram schematically showing a pre-doping process for the first electrode.

FIG. 2A is a perspective view schematically showing a first electrode according to an exemplary embodiment of the present invention and FIG. 2B is a diagram schematically showing a pre-doping process for the first electrode.

Referring to FIG. 2A, the first electrode 10 may be made by forming the first electrode material 12 on the first conductive sheet 11.

The first electrode 10 may be pre-doped with the lithium ions before and after the separating membrane and the second electrode are stacked.

As shown in FIG. 2B, current is applied by putting the first electrode 10 into an electrolyte E and using a metal M including lithium as a counter electrode.

The metal M including the lithium is not specifically limited if it can supply lithium ions. For example, a metal capable of supplying lithium ions, including lithium elements such as a lithium metal or a lithium-aluminum alloy may be used.

If current is applied and then, voltage is slowly lowered, the lithium ions from the metal M including lithium are emitted and the first electrode material 12 is doped with the lithium ions.

The electrolyte E used in the pre-doping process may use the electrolyte included in the foregoing lithium ion capacitor. As described above, the electrolyte according to the exemplary embodiment of the present invention may increase the degree of dissociation of the lithium salt and has the excellent wettability for the electrode material, as well as low reactivity with the electrode material to increase the doping efficiency of the lithium ion.

Therefore, the potential of the first electrode 10 may be further lowered and the lithium ion capacitor may have the high-output and high-energy density characteristics.

Hereinafter, the present invention will be described in more detail with reference to an example and a comparative example.

EXAMPLE

Graphite (KS6, Timcal company) was used as a cathode active material and super-P (Timcal company), CMC, and SBR were mixed and dispersed in a weight ratio of 95:3:1.5: 1.5, together with water, thereby producing a slurry. A sheet having a thickness of 80 μm was produced by coating, drying, and pressing a slurry on a copper foil current collector and was cut to be 3 cm in width and 4 cm in length, thereby producing the anode. The produced anode was impregnated in the electrolyte to dope the lithium ions via the electrochemical doping method. As the electrolyte, a mixing solvent including ethylene carbonate (EC), propylene carbonate (PC), methyl propionate (MP), and ethyl methyl carbonate (EMC), and a solvent including 1.2 M of $LiPF_6$ were used. The mixing ratio (EC:PC:MP:EMC) between the mixing solvents was set to be 3:1:1:3.

The cathode active material used non-porous carbon (available from GS Caltex Company) and carbon black, CMC, and SBR were mixed and dispersed at a ratio of 80:10: 5:5, together with water, thereby producing a slurry. A sheet having a thickness of 80 μm was produced by coating, drying, and pressing a slurry on a aluminum current collector and was cut to be 3 cm in width and 4 cm in length, thereby producing the cathode.

The anode and cathode doped with the lithium ions were disposed opposite to each other with 25 μm of polyethylene-based separating membrane disposed therebetween, and impregnated in the electrolyte used in the doping, thereby producing the capacitor cell.

Comparative Example

Similar to the Example, the capacitor cell was produced, but as the electrolyte included in the doping of the anode and the capacitor cell, a mixing solvent including ethylene carbonate, propylene carbonate, and diethyl carbonate was used and the mixing ratio (EC:PC:DEC) between the mixing solvent was set to be 3:1:4.

The following Table 1 showed the results of measuring the capacity and resistance according the change in temperature of the capacitor cell produced in the Example and the Comparative Example.

TABLE 1

| | Example | | Comparative Example | |
|---|---|---|---|---|
| Temperature | Capacity (F) | Resistance (Ω) | Capacity (F) | Resistance (Ω) |
| +25° C. | 6.5 | 1.1 | 6.1 | 1.3 |
| −20° C. | 5.5 | 6.6 | 4.2 | 9.4 |
| −30° C. | 4.6 | 10.1 | 2.9 | 20.6 |
| −40° C. | 3.3 | 25.3 | 1.8 | 41.9 |

Referring to the foregoing Table 1, the Example shows the change rate in capacity is small while the resistance is largely not increased, even in the low-temperature environment, as compared to the Comparative Example. Therefore, the lithium ion capacitor according to the exemplary embodiment of the present invention can expand the temperature range in which a device is usable, and does not largely increase the resistance, even in the low-temperature environment, thereby making it possible to maintain the high-output characteristics.

As set forth above, the electrolyte of the lithium ion capacitor can be used as the electrolyte for operating the lithium ion capacitor and can be used during the pre-doping of the anode of the lithium ion capacitor with the lithium ions.

The electrolyte according to the exemplary embodiment of the present invention can more easily dissociate lithium salt, suppress a rise in the viscosity of the electrolyte, and increase the electric conductivity of the electrolyte. In addition, the present invention can maintain the normal temperature and low temperature characteristics of the electrolyte in equilibrium and has excellent wettability for the electrode material as well as low reactivity with the electrode material.

Therefore, the electrolyte according to the exemplary embodiment of the present invention can increase the pre-doping efficiency of the lithium ions and the lithium ion capacitor including the electrolyte can expand the temperature range in which a device is usable and does not increase the resistance even in the low temperature environment, thereby making it possible to maintain the high output characteristics.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrolyte for a lithium ion capacitor, comprising:
   a lithium salt; and
   a mixing solvent including i) two or more compounds selected from a group consisting of cyclic carbonate compounds, ii) one or more compounds selected from a group consisting of linear carbonate compounds represented by the following Formula 1, and iii) one or more compounds selected from a group consisting of propionate compounds represented by the following Formula 2,

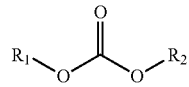

Formula 1 in the above Formula 1,
$R_1$ and $R_2$ are substituted into a halogen element or an alkyl group having 1 to 3 non-substituted carbon atoms, and

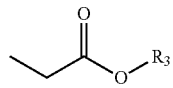

Formula 2 in the above Formula 2,
$R_3$ is substituted into a halogen element or an alkyl group having 1 to 4 non-substituted carbon atoms.

2. The electrolyte for a lithium ion capacitor of claim 1, wherein the cyclic carbonate compound is selected from a group consisting of ethylene carbonate, propylene carbonate, fluoroethylene carbonate, and butylene carbonate.

3. The electrolyte for a lithium ion capacitor of claim 1, wherein the mixing ratio between the two or more cyclic carbonate compounds is 3:1 to 1:3.

4. The electrolyte for a lithium ion capacitor of claim 1, wherein the two or more cyclic carbonate compounds are ethylene carbonate and propylene carbonate and the mixing ratio of the ethylene carbonate and the propylene carbonate is 3:1 to 1:3.

5. The electrolyte for a lithium ion capacitor of claim 1, wherein the content of the cyclic carbonate compound is 20 parts by weight to 50 parts by weight for 100 parts by weight of the mixing solvent.

6. The electrolyte for a lithium ion capacitor of claim 1, wherein the linear carbonate compound is selected from a group consisting of dimethyl carbonate, ethyl methyl carbonate, diethyl carbonate, and methyl propyl carbonate.

7. The electrolyte for a lithium ion capacitor of claim 1, wherein the content of the cyclic carbonate compound is 10 parts by weight to 40 parts by weight for 100 parts by weight of the mixing solvent.

8. The electrolyte for a lithium ion capacitor of claim 1, wherein the propionate compound is selected from a group consisting of methyl propionate, ethyl propionate, propyl propionate, or butyl propionate.

9. The electrolyte for a lithium ion capacitor of claim 1, wherein the content of the propionate compound is 20 parts by weight to 50 parts by weight for 100 parts by weight of the mixing solvent.

10. The electrolyte for a lithium ion capacitor of claim 1, wherein the mixing solvent includes ethylene carbonate, propylene carbonate, ethyl methyl carbonate, and methyl propionate.

11. A lithium ion capacitor, comprising:
a first electrode made of an electrode material capable of reversibly carrying lithium ions;
a second electrode disposed to be opposite to the first electrode;
a separating membrane disposed between the first and second electrodes; and
an electrolyte impregnating the first electrode, the second electrode, and the separating membrane,
wherein the electrolyte includes:
a lithium salt; and
a mixing solvent including i) two or more compounds selected from a group consisting of cyclic carbonate compounds, ii) one or more compounds selected from a group consisting of linear carbonate compounds represented by the following Formula 1, and iii) one or more compounds selected from a group consisting of propionate compounds represented by the following Formula 2,

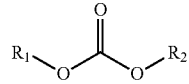

Formula 1 in the above Formula 1,
$R_1$ and $R_2$ are substituted into a halogen element or an alkyl group having 1 to 3 non-substituted carbon atoms, and

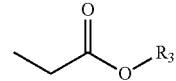

Formula 2 in the above Formula 2,
$R_3$ is substituted into a halogen element or an alkyl group having 1 to 4 non-substituted carbon atoms.

* * * * *